United States Patent [19]
Skarda

[11] Patent Number: 5,828,642
[45] Date of Patent: *Oct. 27, 1998

[54] DEVICE AND METHOD FOR REDUCING POWER CONSUMPTION IN A DISK DRIVE

[75] Inventor: Louis J. Skarda, Lake Elmo, Minn.

[73] Assignee: Imation Corp., Oakdale, Minn.

[ * ] Notice: The term of this patent shall not extend beyond the expiration date of Pat. No. 5,675,567.

[21] Appl. No.: 942,965

[22] Filed: Oct. 3, 1997

Related U.S. Application Data

[62] Division of Ser. No. 525,399, Sep. 8, 1995, Pat. No. 5,675,567.

[51] Int. Cl.$^6$ .................................................. G11B 33/02
[52] U.S. Cl. ............................................ 369/77.2; 360/69
[58] Field of Search ................................. 369/75.1, 75.2, 369/77.1, 77.2; 360/69, 70, 71

[56] References Cited

U.S. PATENT DOCUMENTS

| | | | |
|---|---|---|---|
| 4,658,307 | 4/1987 | Tsuyuguchi et al. | 360/69 |
| 4,783,706 | 11/1988 | Shoji et al. | 360/78.13 |
| 5,155,638 | 10/1992 | Aikawa et al. | 360/69 |
| 5,227,927 | 7/1993 | Fukushima et al. | 360/69 |
| 5,345,343 | 9/1994 | Miura et al. | 360/60 |
| 5,400,190 | 3/1995 | Miura | 360/69 |
| 5,408,369 | 4/1995 | Miura et al. | 360/75 |

*Primary Examiner*—William J. Klimowicz
*Attorney, Agent, or Firm*—Eric D. Levinson

[57] ABSTRACT

A device and method for reducing power consumption in a data storage disk drive to sense whether a disk is loaded in the disk drive. The device and method further operate to couple a drive power terminal and a host power terminal when the disk is loaded in the disk drive, and decouple the drive power terminal and the host power terminal when the disk is not loaded in the disk drive. The device and method thereby operate to decouple power from the electronic host device to the disk drive when the disk drive is not actually in use, increasing power efficiency of the disk drive, and conserving the amount of power drawn from the host electronic device.

10 Claims, 6 Drawing Sheets

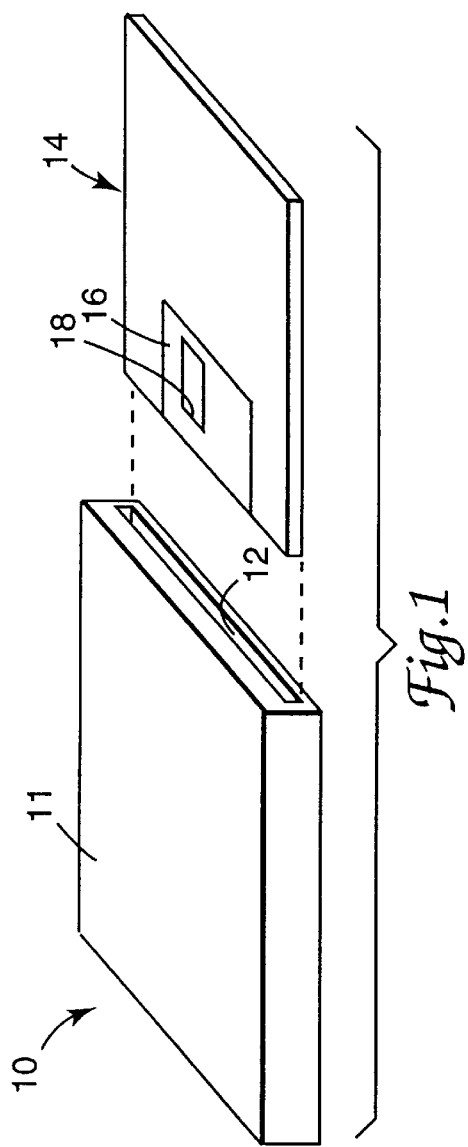
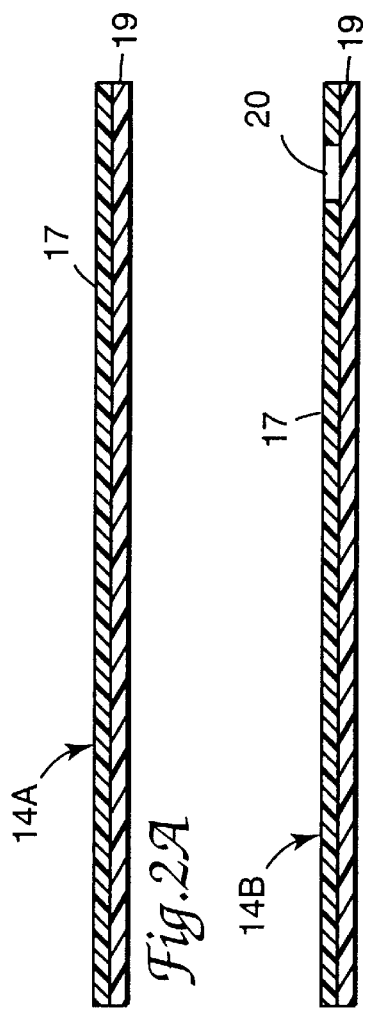
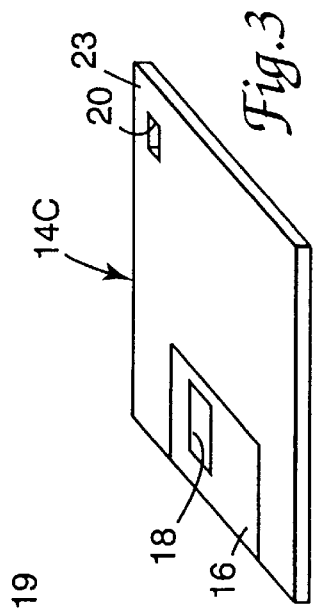

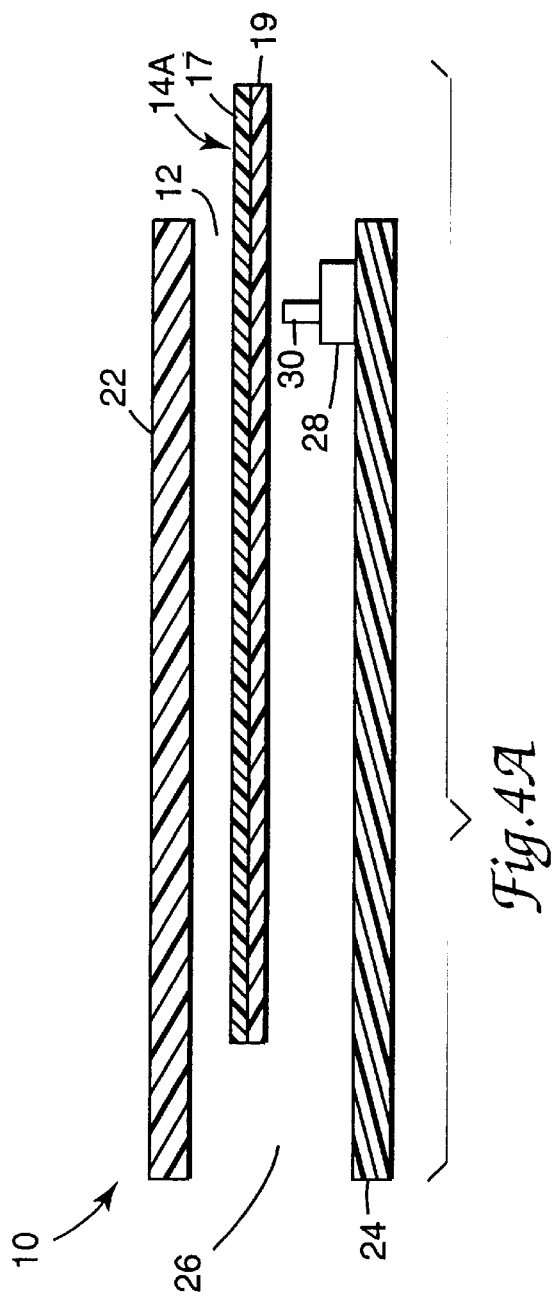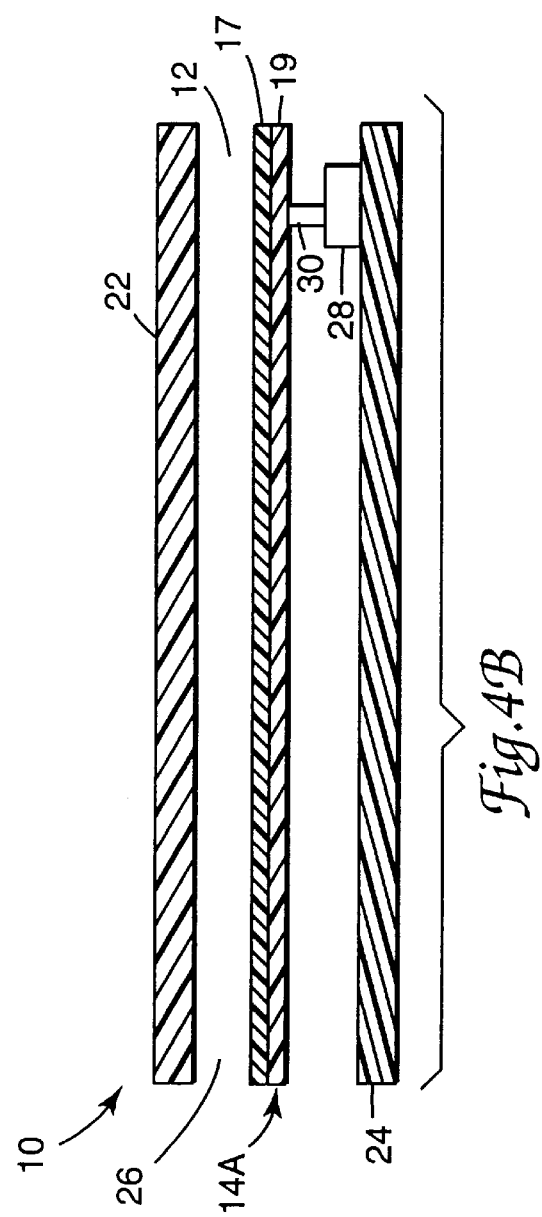

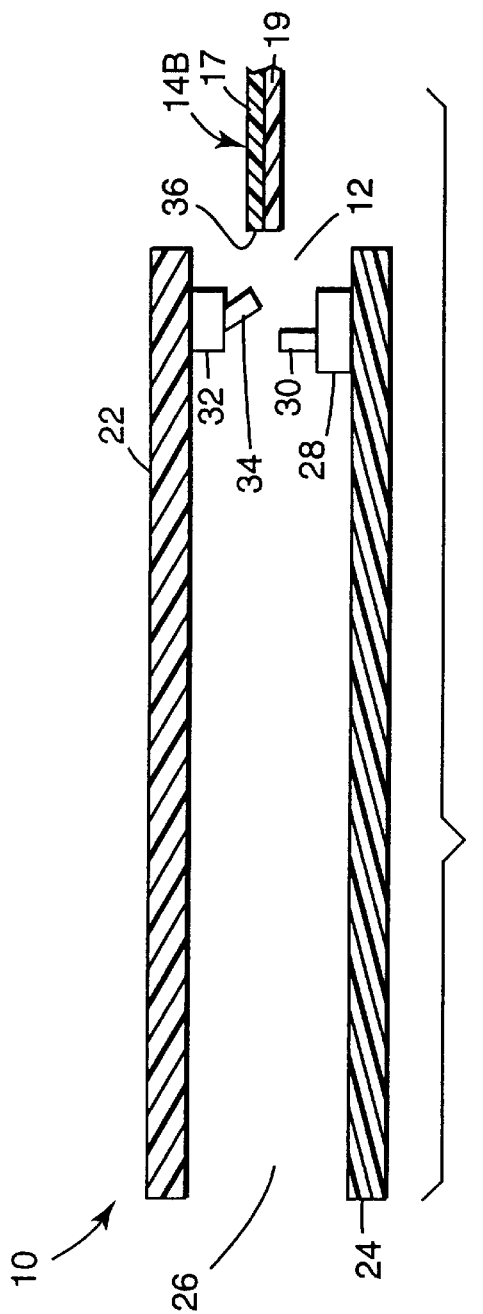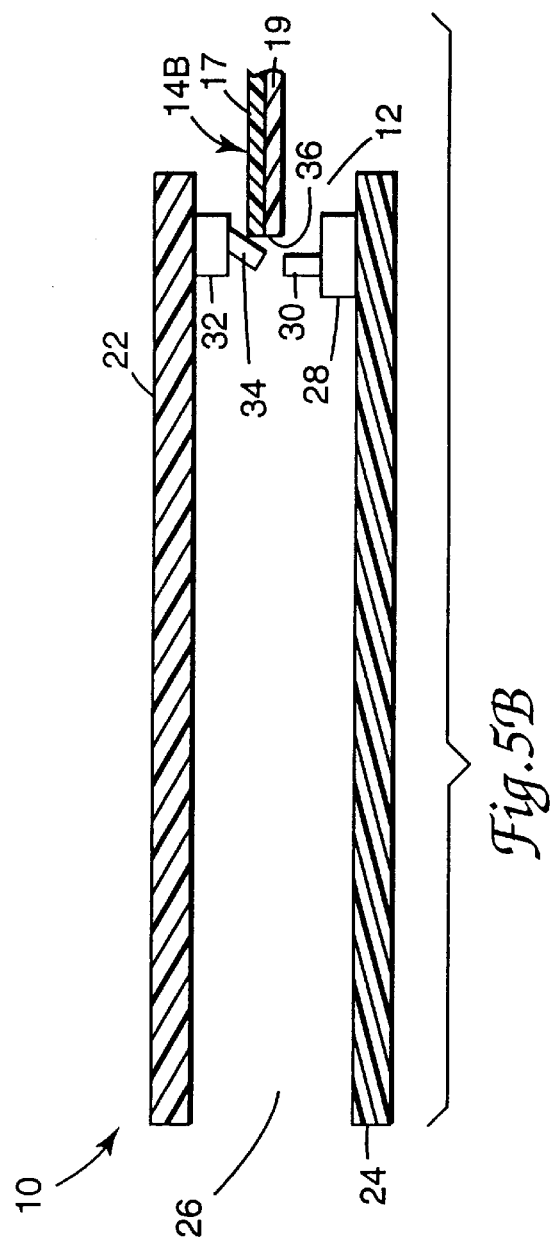

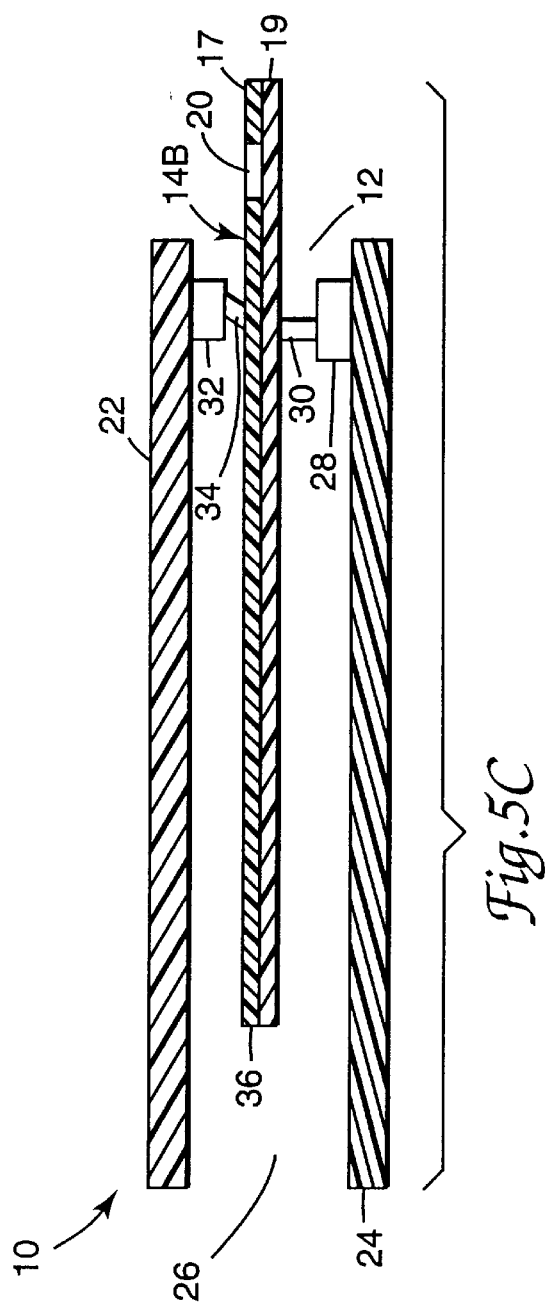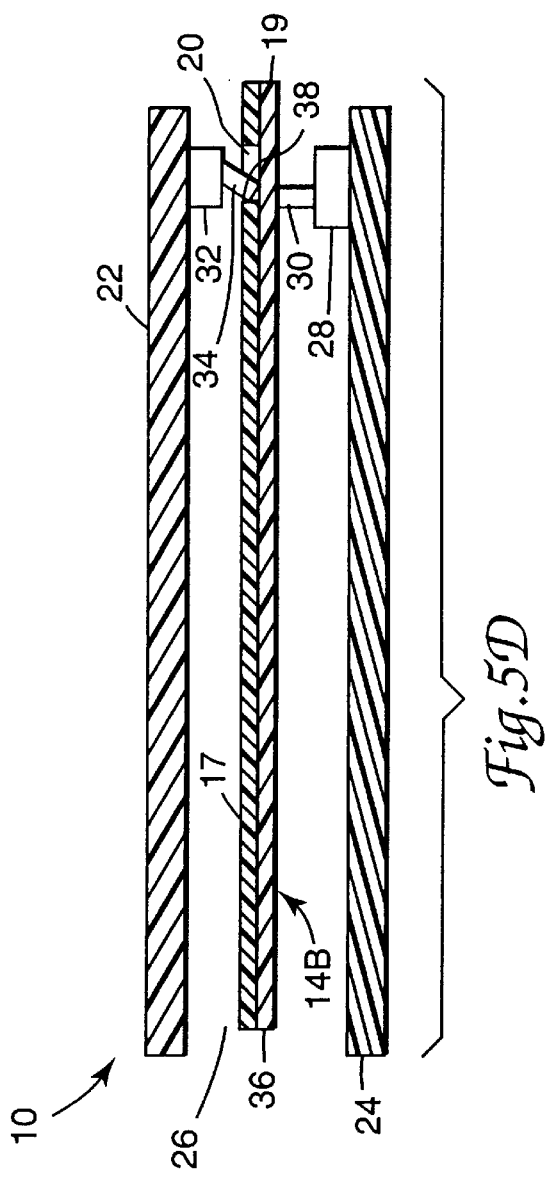

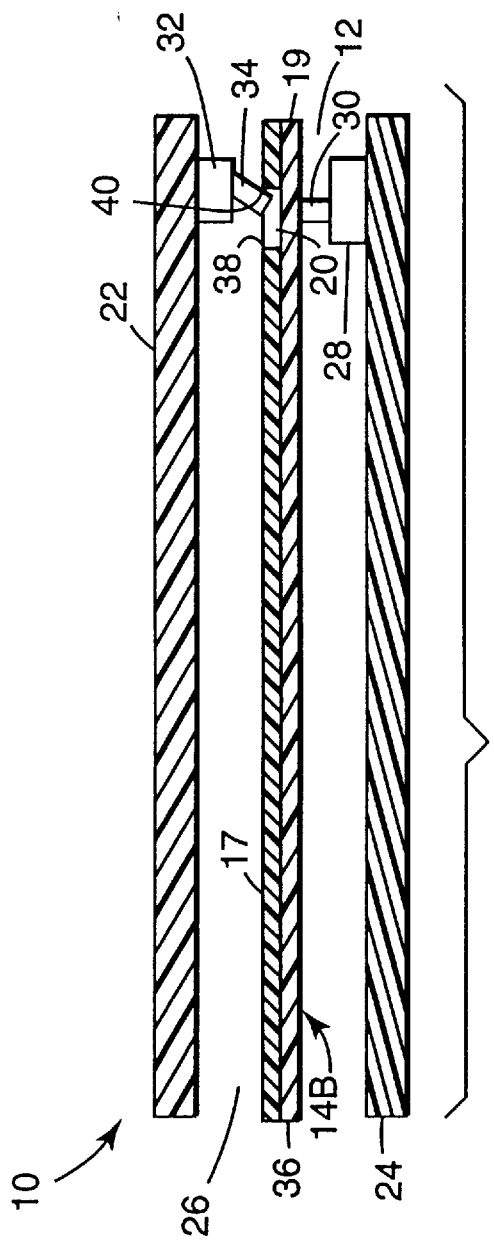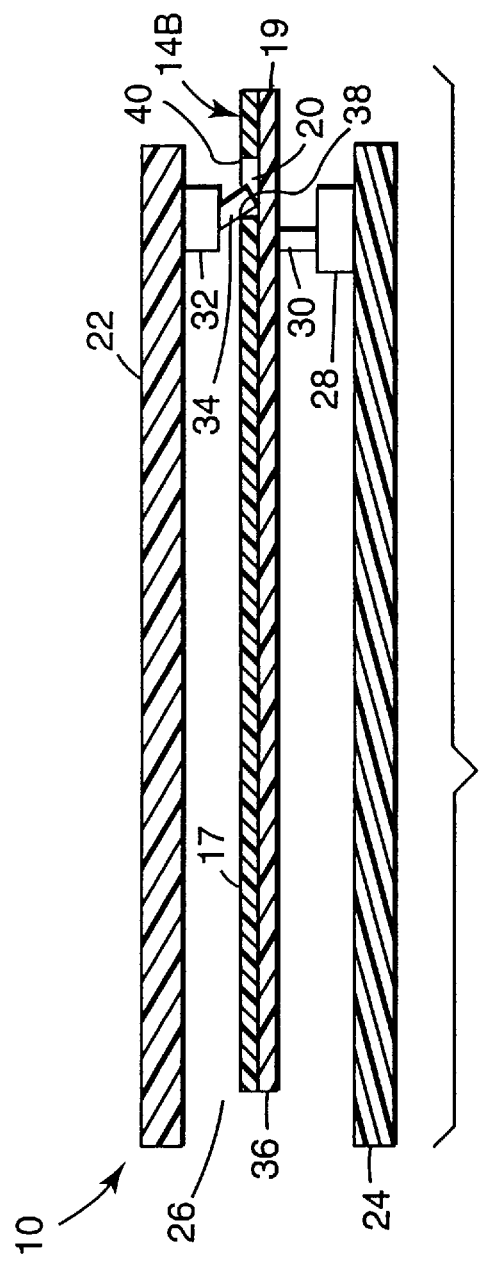

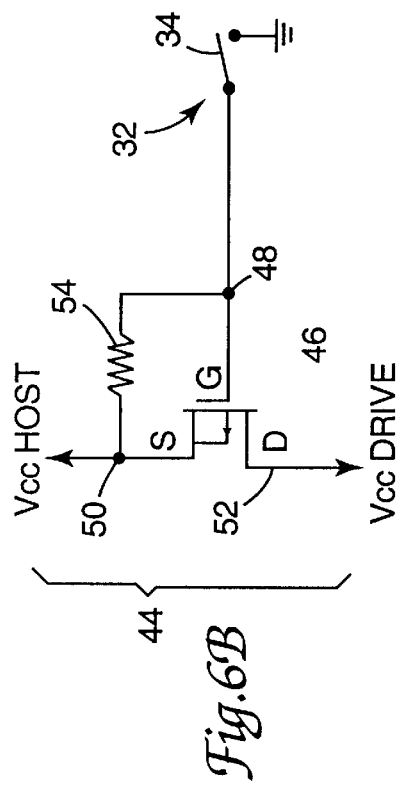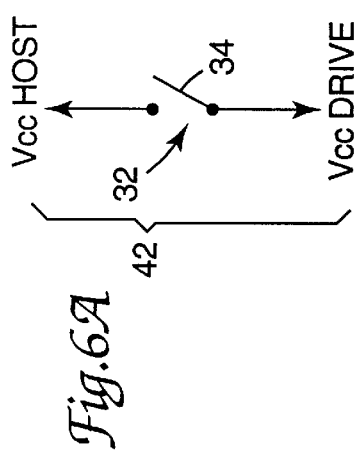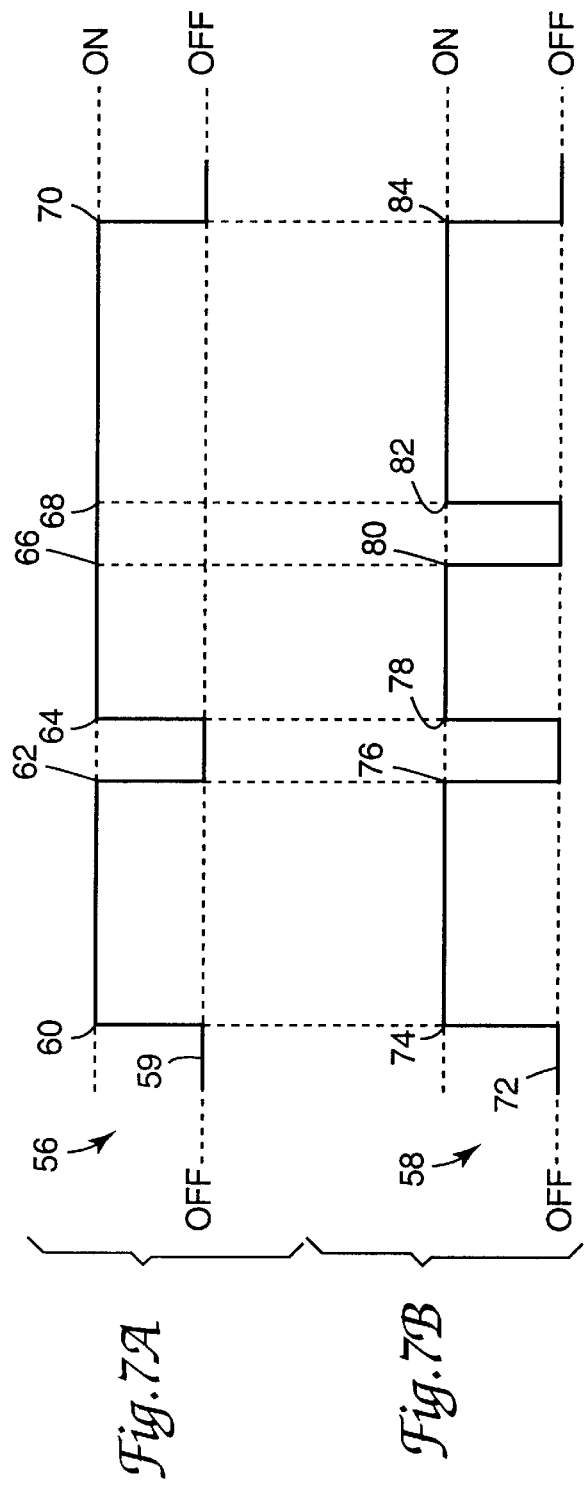

DEVICE AND METHOD FOR REDUCING POWER CONSUMPTION IN A DISK DRIVE

This is a Division of application Ser. No. 08/525,399 filed Sep. 8, 1995 now U.S. Pat. No. 5,675,567.

Field of the Invention

The present invention relates to data storage technology, and, more particularly, to reduction of power consumption in a data storage disk drive.

DISCUSSION OF RELATED ART

Many electronic devices include internally mounted data storage disk drives. Such disk drives are provided, for example, in desktop personal computers, mobile personal computers, and in some handheld personal digital assistants (PDA's). The disk drive is designed to accept a data storage disk loaded by a user, and includes hardware for reading data from the disk and, in most cases, writing data to the disk. A CD-ROM drive is an example of a data storage disk drive including only a read capability. The disk drive may be designed to accept disks containing, for example, magnetic storage media, magneto-optical storage media, or optical storage media.

For operation, the disk drive draws power from the host electronic device in which it is mounted. The disk drive draws power from the host electronic device when the drive is not in use and, in particular, when a disk is not even loaded in the disk drive. The power consumed by the disk drive is a significant concern, particularly when the host electronic device is a mobile personal computer or PDA with limited battery resources. To reduce power consumption during periods of nonuse, existing disk drives include circuitry and/or software for adjusting power consumption in a modal manner.

The power adjustment mechanism used in an existing disk drive typically provides an "operating" mode and a "standby" mode. In the operating mode, the disk drive draws from the host electronic device maximum power levels needed for read, write, and seek operations. In the standby mode, the disk draws a minimum power level from the host electronic device. The maximum average power consumption in the standby mode of existing two megabyte magnetic media-based disk drives generally falls in the range of approximately 30 to 60 milliwatts. The above range of average standby power consumption represents a substantial drain for many battery-powered mobile personal computers and PDA's. The average power consumption in the standby mode of a one-hundred twenty megabyte magnetic media-based disk drive could be on the order of 1.5 watts. The amount of standby power consumption for such a drive represents a substantial drain for many desktop personal computers, and may be a prohibitive drain for battery-powered mobile personal computers.

Although the standby mode provided in existing disk drives reduces the amount of power consumed during periods of nonuse, even this reduced amount of power consumption remains a significant concern given efforts to maximize battery life in mobile personal computers and PDA's. From the standpoint of power efficiency, reduced power consumption also remains a concern in desktop personal computers. The standby power consumption is a problem for data storage disk drives in general, and may be particularly troublesome for one-hundred twenty megabyte drives. Accordingly, there is a need for a device and method for further reducing power consumption in data storage disk drives.

SUMMARY OF THE INVENTION

The present invention is directed to a device and method for reducing power consumption in a data storage disk drive. The device and method of the present invention operate to decouple power from the electronic host device to the disk drive when the disk drive does not contain a disk. The device and method of the present invention thereby provide a mode of operation in which the disk drive draws substantially no power from the host electronic device. The device and method increase the power efficiency of the disk drive, and conserve the amount of power drawn from the host electronic device. Thus, the device and method are capable of maximizing battery resources when used with mobile personal computers and PDA's. The device and method of the present invention are applicable to a wide variety of data storage disk drives including, for example, magnetic media-based drives, magneto-optical media-based drives, and optical media-based drives.

In a first embodiment, the present invention provides a power conservation device for a data storage disk drive, wherein the disk drive is mounted in a host electronic device, and the disk drive includes a drive power terminal for receiving power from a host power terminal associated with the host electronic device, the power conservation device comprising sensing means for sensing whether a disk is loaded in the disk drive, and switching means, responsive to the sensing means, for coupling the drive power terminal and the host power terminal when the disk is loaded in the disk drive, and decoupling the drive power terminal and the host power terminal when the disk is not loaded in the disk drive.

In a second embodiment, the present invention provides a power conservation method for a data storage disk drive, wherein the disk drive is mounted in a host electronic device, and the disk drive includes a drive power terminal for receiving power from a host power terminal associated with the host electronic device, the power conservation method comprising the steps of sensing whether a disk is loaded in the disk drive, coupling the drive power terminal and the host power terminal when the disk is loaded in the disk drive, and decoupling the drive power terminal and the host power terminal when the disk is not loaded in the disk drive.

In a third embodiment, the present invention provides a data storage disk drive comprising a housing for receiving a data storage disk, the housing being mounted within a host electronic device, hardware, mounted within the housing, for reading data from the disk, a drive power terminal for receiving power from a host power terminal associated with the host electronic device, sensing means for sensing whether the disk is loaded in the housing, and. switching means, responsive to the sensing means, for coupling the drive power terminal and the host power terminal when the disk is loaded in the housing, and decoupling the drive power terminal and the host power terminal when the disk is not loaded in the housing.

In a fourth embodiment, the present invention provides a data storage disk for reducing power consumption in a disk drive, wherein the disk drive is mounted in a host electronic device, and wherein the disk drive includes a drive power terminal that draws power from a host power terminal of the host electronic device, the data storage disk comprising a disk housing, an article of data storage media mounted within the disk housing, a structure on the disk for moving an actuator of a toggle switch in the disk drive into a first position when the disk is loaded in the disk drive and into a second position when the disk is withdrawn from the disk drive, wherein the toggle switch decouples the drive power terminal from the host power terminal when the structure moves the actuator into the second position, and couples the drive power terminal to the host power terminal when the structure moves the actuator into the first position.

BRIEF DESCRIPTION OF DRAWINGS

FIG. 1 is a diagram of a conventional data storage disk drive;

FIGS. 2A and 2B are cross-sectional side views of exemplary data storage disks appropriate for use with a device and method for reducing power consumption in a disk drive, in accordance with the present invention;

FIG. 3 is a perspective view of a data storage disk having a structure as in FIG. 2B for facilitating operation of a device and method in accordance with the present invention;

FIGS. 4A and 4B are cross-sectional side views of a data storage disk drive incorporating a first implementation of a device and method for reducing power consumption in the disk drive, in accordance with the present invention;

FIGS. 5A–5F are cross-sectional side views of a data storage disk drive incorporating a second implementation of a device and method for reducing power consumption in the disk drive, in accordance with the present invention;

FIGS. 6A and 6B are circuit diagrams illustrating exemplary switching circuits appropriate for use with a device and method for reducing power consumption in a disk drive, in accordance with the present invention; and FIGS. 7A and 7B are timing diagrams illustrating operation of a device and method for reducing power consumption in a disk drive, in accordance with the present invention.

DETAILED DESCRIPTION OF THE PREFERRED EMBODIMENTS

FIG. 1 is a diagram of a conventional data storage disk drive 10. The disk drive 10 has a housing 11 that may be mounted in a host electronic device (not shown) such as, for example, a desktop personal computer, a mobile personal computer, or a handheld personal digital assistant (PDA). As shown in FIG. 1, disk drive 10 includes a slot 12 for receiving a data storage disk 14 inserted by a user. The disk 14 may be configured to contain, for example, magnetic media, magneto-optical media, or optical media. Thus, the exact structural configuration of disk 14 may vary from that shown in FIG. 1. The exemplary disk 14 of FIG. 1 includes a shutter 16 with a media access opening 18 through which disk drive 10 accesses the media contained in the disk. The disk drive 10 includes conventional hardware (not shown) for reading data from disk 14 and, in most cases, writing data to the disk.

A conventional disk drive 10, as shown in FIG. 1, draws power from the host electronic device in which it is mounted when the drive is not in use and, in particular, when disk 14 is not even loaded in the disk drive. The power consumed by the disk drive during periods of nonuse is, at the very least, inefficient, and is a significant concern when the host electronic device is a mobile personal computer or a PDA. Specifically, consumption of power during periods of nonuse can significantly drain the limited battery resources associated with mobile personal computers or PDA's.

In accordance with the present invention, there is provided a device and method for reducing power consumption in a data storage disk drive. The device and method operate to sense whether a disk is loaded in the disk drive. The device and method further operate to couple a drive power terminal and a host power terminal when the disk is loaded in the disk drive, and decouple the drive power terminal and the host power terminal when the disk is not loaded in the disk drive. The device and method thereby operate to decouple power from the host electronic device to the disk drive when the disk drive is not actually in use. The device and method increase power efficiency of the disk drive, and conserve the amount of power drawn from the host electronic device.

FIGS. 2A and 2B are cross-sectional side views of exemplary data storage disks 14A, 14B appropriate for use with the device and method of the present invention. The device and method of the present invention are not limited to application in conjunction with data storage disks conforming to disks 14A, 14B of FIGS. 2A and 2B. Rather, FIGS. 2A and 2B are provided merely for purposes of example in illustrating the concepts and functionality underlying the device and method of the present invention.

FIG. 2A is a cross-sectional side view of a conventional data storage disk 14A. As shown in FIG. 2A, disk 14A includes a first half 17 and a second half 19 that are joined together to form a disk housing. As will be described, disk 14A may be readily used with one implementation of the device and method of the present invention.

FIG. 2B is a cross-sectional side view of a data storage disk 14B having a structure for facilitating operation of a device and method in accordance with the present invention. Specifically, the structure is configured to engage a sensing means used by the device and method of the present invention to sense whether disk 14B is loaded in disk drive 10. The shape and size of the structure may vary. In the example of FIG. 2B, the structure comprises an aperture 20 formed in first half 17 of the disk housing of disk 14B. The structure could be formed, however, in another area of first half 17 or in second half 19 of the disk housing. In addition, the sensing structure alternatively could be realized by extending a portion of the housing outward to form a convex structure such as a bump for engaging a sensing means. The structure can be integrally formed with disk 14B by, for example, molding the aperture into the disk. The aperture 20, for example, could be molded into first half 17 of the disk housing. Alternatively, aperture 20 could be formed by stamping or coring out a portion of first half 17 of the disk housing. As another alternative, if realized by a bump or flange extending from disk 14B, the structure could be a discrete piece fastened onto the disk.

FIG. 3 is a perspective view of data storage disk 14B, in accordance with the present invention. Like the conventional disk 14 shown in FIG. 1, disk 14B may include shutter 16 and media access opening 18. In the example of FIG. 3, aperture 20 is shown as being formed in a region of the disk housing adjacent a rear right corner 23, relative to the direction of insertion of disk 14B into slot 12 of disk drive 10. However, aperture 20 may be formed with disk 14B in a variety of regions of the disk housing, subject to constraints dictated by the mounting of a sensing means within an interior of disk drive 10, as well as other design considerations.

FIGS. 4A and 4B are cross-sectional side views of a data storage disk drive incorporating a first implementation of a device and method for reducing power consumption in the disk drive, in accordance with the present invention. With reference to FIG. 4A, disk drive 10 includes a top wall 22 and a bottom wall 24. The top and bottom walls 22, 24 define an interior 26 and slot 12. A user can load either of disks 14A and 14B into interior 26 via slot 12. Disk 14A will be shown in FIGS. 4A and 4B for purposes of example.

The disk drive 10 incorporates a power conservation device comprising a sensing means and a switching means. The sensing means senses whether disk 14A is loaded in disk drive 10. The switching means is responsive to the sensing means. Specifically, when disk 14A is loaded in disk drive 10, the switching means couples a drive power terminal associated with disk drive 10 and a host power terminal associated with the host electronic device in which the drive is mounted. The switching means thereby provides power from the host electronic device to disk drive 10. When disk 14A is not loaded in disk drive 10, the switching means decouples the drive power terminal and the host power terminal. The switching means thereby conserves power in the host electronic device during periods of nonuse.

In the example illustrated by FIGS. 4A and 4B, the switching means comprises an electromechanical switch 28 mounted within interior 26 of disk drive 10. The switch 28 may be mounted, for example, on an interior surface of bottom wall 24 of disk drive 10. The sensing means may comprise an actuator 30 associated with switch 28. With reference to FIG. 4A, actuator 30 is spring loaded to be normally biased outward relative to switch 28. In the outward position, a switching junction inside switch 28 occupies an open state. In the open state, the drive power terminal and the host power terminal are decoupled from one another. The switch 28 is mounted within drive 10 such that actuator 30 can be engaged by a portion of disk 14A when the disk is loaded into the drive. When actuator 30 is not engaged by disk 14A, the actuator remains in the outward position and the switching junction remains in the open state. Nonengagement indicates that disk 14A is not loaded in drive 10 and that the drive therefore is in a period of nonuse. In the open state, the switching junction prevents drive 10 from drawing power from the host electronic device.

When actuator 30 is engaged by disk 14A, however, actuator 30 is pushed inward and closes the switching junction inside switch 28. Engagement indicates that the user has inserted a disk 14A into drive 10 and that the drive therefore has entered a period of use. As shown in FIG. 4B, for example, disk 14A may engage actuator 30 upon insertion into interior 26 of drive 10. The disk 14A is inserted into slot 12 to ride along a carriage (not shown) within drive interior 26. When disk 14A has been inserted a sufficient distance into drive 10, the carriage drops disk 14A downward into a read/write position for access by read/write hardware. As disk 14A is dropped downward, it engages actuator 30. The disk 14A pushes actuator 30 inward, relative to switch 28, thereby closing the switching junction. In the closed state, the switching junction couples the drive power terminal and the host power terminal to provide power from the host electronic device to disk drive 10 for use.

The switch 28 may be realized by incorporating a dedicated switch within interior 26 of drive 10 for use only with the device and method of the present invention. Alternatively, switch 28 could be realized by adapting a "disk-presence" switch already provided in the housing of drive 10. Specifically, conventional disk drives include a disk-presence switch for indicating whether a disk has been loaded into the drive. The disk presence switch may be used to activate a spindle motor in drive 10 and to send a ready signal to the host electronic device. The existing terminals of the disk-presence switch could be used for control of a power switching junction configured to couple and decouple the drive power terminal and the host power terminal. The current capacity of the disk-presence switch in an existing drive ordinarily would need to be increased if power were to be switched directly across the switch.

The electromechanical switch 28 shown in FIGS. 4A and 4B is advantageous because it draws no power from the host electronic device when drive 10 is not in use. The electromechanical switch 28 also is advantageous due to the adaptability of the disk presence switch provided in conventional drives for use by the device and method of the present invention. An optical or electromagnetic switch could be substituted for electromechanical switch 28, however, if such a switch provided sufficient savings in power efficiency over the conventional standby mode. In other words, if the optical or electromagnetic switch consumed significantly less power during periods of drive nonuse than the conventional standby mode of the drive, the optical or electromagnetic switch could be selected for use in the device and method of the present invention. The use of an optical or electromagnetic switch conceivably could be attractive due to size, ease of use, or ease of placement within drive 10.

FIGS. 5A–5F are cross-sectional side views of a data storage disk drive 10 incorporating a second implementation of a device and method for reducing power consumption in the disk drive, in accordance with the present invention. The second implementation illustrated by FIGS. 5A–5F can be used in conjunction with either of disks 14A, 14B shown in FIGS. 2A and 2B, respectively. However, use of the power saving feature of the present invention with the second implementation of FIGS. 5A–5F requires a disk having a structure such as aperture 20 of disk 14B, as will be described.

As in the first implementation shown in FIGS. 4A and 4B, the second implementation makes use of a switching means and a sensing means. With reference to FIG. 5A, the switching means may comprise an electromechanical switch 32 and the sensing means may comprise an actuator 34 associated with the switch. In the example of FIG. 5A, switch 32 is a two-position toggle switch. The actuator 34 is mounted in a socket in switch 32, and is configured to toggle between a first position and a second position. In addition, actuator 34 preferably is spring loaded, with the spring biasing the actuator outward from the socket of switch 32. The actuator 34 is configured for engagement by a portion of either of disks 14A and 14B and, in particular, by a structure such as aperture 20 formed in disk 14B. For purposes of illustration, operation of the device and method of the present invention will be shown in conjunction with disk 14B in FIGS. 5A–5F.

The actuator 34 initially occupies either a first "on" position or a second "off" position when disk 14B is not loaded in drive 10. FIG. 5A shows actuator 34 in the second position. In this second position, actuator 34 opens a switching junction within switch 32. In the open state, the switching junction decouples the drive power terminal and the host power terminal, preventing drive 10 from drawing power from the host electronic device.

With reference to FIG. 5B, when disk 14B is inserted into drive 10, a leading edge 36 of the disk engages actuator 34 and pushes the actuator into the first position. Either of disks 14A and 14B is capable of pushing actuator 34 into the first position. Placement of actuator 34 in the first position indicates that a disk has been loaded into drive 10, and that the drive has entered a period of use. In the first position, actuator 34 closes the switching junction within switch 32. In the closed state, the switching junction couples the drive power terminal and the host power terminal, allowing drive 10 to draw power from the host electronic device for operation.

With reference to FIG. 5C, as disk 14B continues to be inserted into drive 10, the spring-loaded actuator 34 tends to ride up over a top surface of the disk and is thereby pushed into the socket of switch 32. As shown in FIG. 5D, actuator 34 eventually engages a structure on disk 14B. In the example of FIG. 5D, the structure takes the form of aperture 20. The actuator 34 first encounters a side wall 38 of aperture 20. The aperture 20 allows the spring-loaded actuator 34 to extend outward. As also shown in FIG. 5D, disk 14B can be inserted into a carriage (not shown) that drops the disk downward to depress actuator 30 of disk presence switch 28. Thus, the second implementation also may incorporate the disk presence switch already provided in drive 10 for purposes of activating the spindle motor and sending a ready signal to the host electronic device.

Upon continued insertion, actuator 34 encounters another side wall 40 at a maximum point of insertion, as shown in FIG. 5E. Throughout insertion, actuator 34 remains in the first position, closing the switching junction within switch 32, and thereby allowing drive 10 to draw power from the host electronic device. Upon withdrawal of disk 14B from drive 10, however, side wall 38 of aperture 20 engages actuator 34. As indicated by FIG. 5F, side wall 38 of aperture 20 moves actuator 34 into the second position during withdrawal. To ensure that actuator 34 does not move into the second position prior to engagement with side wall 38, it may be desirable to reduce friction between the actuator and top surface of disk 14B by, for example, incorporating a small roller or bearing mechanism on the end of the actuator contacting the disk. Movement of actuator 34 into the second position indicates that disk 14B is no longer loaded in drive 10, and that the drive power terminal and host power terminal can be decoupled. In the second position, actuator 34 opens the switching junction within switch 32, decoupling the drive power terminal and the host power terminal. As a result, switch 32 renders drive 10 unable to draw power from the host electronic device in which it is mounted.

A conventional disk 14A would not include a structure such as aperture 20 for engaging actuator 34 upon withdrawal, and therefore would not move the actuator into the second position upon withdrawal. As a result, use of conventional disk 14A with the second implementation of the device and method of the present invention would enable the drive power terminal and host power terminal to be coupled upon insertion of the disk, but would not enable the drive power terminal and host power terminal to be decoupled upon withdrawal. The drive 10 could be configured to enter a conventional stand-by mode when conventional disk 14A does not engage actuator 30 of disk presence switch 28. However, a special "power-saving" disk, such as disk 14B, for example, would be necessary to take advantage of the reduced power consumption afforded by this second implementation of the device and method of the present invention.

FIGS. 6A and 6B are circuit diagrams illustrating exemplary switching circuits appropriate for use with a device and method for reducing power consumption in disk drive 10, in accordance with the present invention. The switching circuits are applicable to both the first implementation illustrated in FIGS. 4A and 4B and the second implementation illustrated in FIGS. 5A–5F.

The circuit 42 shown in FIG. 6A illustrates the use of either switch 28 in the first implementation or switch 32 in the second implementation, by itself, to couple and decouple the drive power terminal VCC DRIVE and the host power terminal VCC HOST. Switch 32 is shown in FIG. 6A. The drive power terminal VCC DRIVE and host power terminal VCC HOST can be coupled directly across the switching junction inside switch 32. Thus, when actuator 34 closes the switching junction, the drive power terminal VCC DRIVE and host power terminal VCC HOST are coupled to one another. When actuator 34 opens the switching junction, the drive power terminal VCC DRIVE and host power terminal VCC HOST are decoupled.

The circuit 42 of FIG. 6A represents a simple and inexpensive implementation. However, because the switch directly couples and decouples power between drive power terminal VCC DRIVE and host power terminal VCC HOST, additional interface and debounce circuitry may be desired. In addition, electrical current requirements may require the use of a switch having a relatively high current capacity. The higher current capacity may undesirably increase the physical size of the switch, making the switch more expensive and perhaps more difficult to position within drive 10.

FIG. 6B is an example of an alternative circuit 44 by which either switch 28 in the first implementation or switch 32 in the second implementation can be used to couple and decouple drive power terminal VCC DRIVE and host power terminal VCC HOST via a power switching transistor 46. Switch 32 is shown in FIG. 6B. As shown in FIG. 6B, the switching junction of switch 32 is coupled between a ground potential and the gate electrode 48 of transistor 46. The use of a field effect transistor 46, as shown in FIG. 6B, is desirable for reduced leakage current. However, a bipolar transistor could be used. The field effect transistor 46 has a source electrode 50 coupled to host power terminal VCC HOST and a drain electrode 52 coupled to drive power terminal VCC DRIVE. A resistor 54 provides a bias potential for gate electrode 48. The transistor 46 is turned off and therefore conducts substantially no current from source electrode 50 to drain electrode 52 when the switching junction of switch 32 is open. As a result, the host power terminal VCC HOST and the drive power terminal VCC DRIVE are decoupled from one another. When actuator 34 closes the switching junction of switch 32, gate electrode 48 is coupled to the ground potential and transistor 46 is turned on. As a result, transistor 46 conducts current from source electrode 50 to drain electrode 52, thereby coupling host power terminal VCC HOST and drive power terminal VCC DRIVE for operation of drive 10.

FIGS. 7A and 7B are a timing diagrams illustrating operation of the second implementation of a device and method for reducing power consumption in disk drive 10, in accordance with the present invention. The timing diagrams illustrate the transition of drive power terminal VCC DRIVE between an "ON" state, in which the drive power terminal is coupled to host power terminal VCC HOST, and an "OFF" state, in which the drive power terminal is decoupled from host power terminal VCC HOST. FIG. 7A shows a first trace 56 illustrating transition of drive power terminal VCC DRIVE during insertion and withdrawal of both a conventional disk 14A and a power-saving disk 14B. FIG. 7B shows a second trace 58 illustrating transition of drive power terminal VCC DRIVE during insertion and withdrawal of only a power-saving disk 14B.

With reference to FIG. 7A, during a first time period 59, a disk is not loaded in drive 10. In first time period 59, it is assumed that a power-saving disk 14B was previously withdrawn from drive 10, and that actuator 34 was thereby moved into the second position. Consequently, drive power terminal VCC DRIVE is off during time period 59. Upon insertion of a power-saving disk 14B, as indicated by reference numeral 60, drive power terminal VCC DRIVE is turned on for use of drive 10. The drive power terminal VCC DRIVE is turned on as a result of engagement of a leading edge 36 of disk 14B with actuator 34 of switch 32, and movement of actuator 34 into the first position. The drive power terminal VCC DRIVE remains on until power saving disk 14B is withdrawn from drive 10, as indicated by reference numeral 62. The drive power terminal VCC DRIVE is turned off as a result of engagement of actuator 34 with the structure on disk 14B during withdrawal, and movement of the actuator into the second position. Upon insertion of a conventional disk 14A, as indicated by reference numeral 64, drive power terminal VCC DRIVE is again turned on as a result of engagement of a leading edge of the disk with actuator 34 and movement of the actuator into the first position. Thus, the device and method of the present invention enable operation of drive 10 with a conventional disk 14A. However, when conventional disk 14A is withdrawn from drive 10, as indicated by reference numeral 66, drive power terminal VCC DRIVE remains on, consuming unnecessary power. The drive power terminal VCC DRIVE remains on because conventional disk 14A does not include a structure for engaging actuator 34 during withdrawal. Therefore, actuator 34 remains in the first position. The drive 10 may be configured to enter a conventional stand-by mode when disk 14A does not engage a disk presence switch in the drive. However, the drive power terminal and host power terminal will not be decoupled, in accordance with the present invention. Upon insertion of a power-saving disk 14B, as indicated by reference numeral 68, the drive power terminal VCC DRIVE remains on. When the power-saving disk 14B is withdrawn from drive 10, as indicated by reference numeral 70, drive power terminal VCC DRIVE is again turned off, thereby reducing power consumption by drive 10.

With reference to FIG. 7B, during a first time period 72, a disk is not loaded in drive 10. In first time period 72, it is again assumed that a power-saving disk 14B was previously withdrawn from drive 10, and that actuator 34 was thereby moved into the second position. Consequently, drive power terminal VCC DRIVE is off during time period 72. Upon insertion of a power-saving disk 14B, as indicated by reference numeral 74, drive power terminal VCC DRIVE is turned on for use of drive 10. The drive power terminal VCC DRIVE remains on until power saving disk 14B is withdrawn from drive 10, as indicated by reference numeral 76. Upon reinsertion of power-saving disk 14B, as indicated by reference numeral 78, drive power terminal VCC DRIVE is again turned on. When power-saving disk 14B is withdrawn from drive 10, as indicated by reference numeral 80, drive power terminal VCC DRIVE is again turned off, eliminating unnecessary power consumption. Upon insertion of a power-saving disk 14B, as indicated by reference numeral 82, drive power terminal VCC DRIVE is again turned on. When the power-saving disk 14B is withdrawn from drive 10, as indicated by reference numeral 84, drive power terminal VCC DRIVE is again turned off, thereby reducing power consumption by drive 10.

What is claimed is:

1. A power conservation device in combination with a data storage disk for use in a disk drive for reducing power consumption in the disk drive, wherein the disk drive is mounted in a host electronic device, and wherein the disk drive includes a drive power terminal for receiving power from a host power terminal associated with the host electronic device, the power conservation device comprising:

sensing means for sensing whether a disk is located in the disk drive,
the sensing means including an actuator configured to engage a structure of the disk, the actuator being configured to move into a first position by engagement with a portion of the disk when the disk is inserted into the disk drive, and configured to move into a second position only by engagement with the structure of the disk during withdrawal of the disk from the disk drive, and further wherein the actuator is configured to move into the first position by insertion of a disk lacking the structure but is not moved into the second position by withdrawal of the disk lacking the structure; and switching means, responsive to the sensing means, for coupling the drive power terminal and the host power terminal when the disk having the structure or lacking the structure is loaded in the disk drive and the actuator is moved into the first position, and for decoupling the drive power terminal and the host power terminal when the disk having the structure only is withdrawn from the disk drive and the structure has moved the actuator into the second position; and the data storage disk comprising:
a disk housing;
an article of data storage media mounted within the disk housing; and the structure on the disk for moving the actuator into the first position when the disk is loaded in the disk drive and into the second position when the disk is withdrawn from the disk drive.

2. The power conservation device in combination with the data storage disk of claim 1, wherein the structure comprises an aperture formed in the disk housing.

3. The power conservation device in combination with the data storage disk of claim 1, wherein the article of data storage media is a magneto-optic disc.

4. The power conservation device in combination with the data storage disk of claim 1, wherein the article of data storage media is an optical disk.

5. The power conservation device in combination with the data storage disk of claim 1, wherein the article of data storage media is a magnetic disk.

6. A data storage system for reducing power consumption of a disk drive, the system comprising the disk drive and a data storage disk, wherein the disk drive is mounted in a host electronic device, and wherein the disk drive includes a drive power terminal for receiving power from a host power terminal associated with the host electronic device, the data storage system comprising:

sensing means for sensing whether a disk is located in the disk drive, the sensing means including an actuator configured to engage a structure of the disk, the actuator being configured to move into a first position by engagement with a portion of the disk when the disk is inserted into the disk drive, and configured to move into a second position only by engagement with the structure of the disk during withdrawal of the disk from the disk drive, and further wherein the actuator is configured to move into the first position by insertion of a disk lacking the structure but is not moved into the second position by withdrawal of the disk lacking the structure; and switching means, responsive to the sensing means, for coupling the drive power terminal and the host power terminal when the disk having the structure or lacking the structure is loaded in the disk drive and the actuator is moved into the first position, and for decoupling the drive power terminal and the host power terminal when the disk having the structure only is withdrawn from the disk drive and the structure has moved the actuator into the second position; and the data storage disk comprising:
  a disk housing;
  an article of data storage media mounted within the disk housing; and
  the structure on the disk for moving the actuator into the first position when the disk is loaded in the disk drive and into the second position when the disk is withdrawn from the disk drive.

7. The data storage system of claim 6, wherein the structure comprises an aperture formed in the disk housing.

8. The data storage system of claim 6, wherein the article of data storage media is a magneto-optic disc.

9. The data storage system of claim 6, wherein the article of data storage media is an optical disc.

10. The data storage system of claim 6, wherein the article of data storage media is a magnetic disc.

* * * * *